United States Patent [19]

Silvers

[11] Patent Number: 5,427,474
[45] Date of Patent: Jun. 27, 1995

[54] DOUBLE CONTAINMENT PIPING SYSTEM AND CENTRALIZATION SEAL THEREFOR

[75] Inventor: Terrel W. Silvers, Burkburnett, Tex.

[73] Assignee: Ameron, Inc., Pasadena, Calif.

[21] Appl. No.: 8,752

[22] Filed: Jan. 25, 1993

[51] Int. Cl.⁶ .............................. F16L 1/00
[52] U.S. Cl. ........................ 405/52; 285/93; 285/138; 405/53; 405/128
[58] Field of Search ............ 405/52, 53, 128, 129, 405/154–157; 285/133.1, 138, 93, 294, 297

[56] References Cited

U.S. PATENT DOCUMENTS

| | | | |
|---|---|---|---|
| 3,146,005 | 8/1964 | Peyton | 285/138 X |
| 3,325,195 | 6/1967 | Margis | 285/294 |
| 3,582,112 | 6/1971 | Pico . | |
| 4,216,981 | 8/1980 | Jensen . | |
| 4,667,505 | 5/1987 | Sharp | 285/133.1 X |
| 4,805,444 | 2/1989 | Webb . | |
| 4,886,305 | 12/1989 | Martin . | |
| 4,932,257 | 6/1990 | Webb . | |
| 4,938,299 | 7/1990 | Jelsma . | |
| 4,971,477 | 11/1990 | Webb et al. | 405/52 X |
| 5,022,685 | 6/1991 | Stiskin et al. . | |
| 5,098,221 | 3/1992 | Osborne . | |
| 5,257,652 | 11/1993 | Lawrence | 405/52 X |
| 5,263,794 | 11/1993 | Webb . | |

Primary Examiner—Dennis L. Taylor
Attorney, Agent, or Firm—Pretty, Schroeder, Brueggemann & Clark

[57] ABSTRACT

A double containment piping system for securing a primary pipeline in position within and enabling pressure testing of a surrounding secondary pipeline which interconnects two or more sump chambers. Centralization seals are affixed to the interior surface of opposite ends of the secondary pipeline and to an adjacent exterior surface of the primary pipeline to form an airtight wall and seal the space between these surfaces. An air insertion fitting allows pressure testing of the sealed spaces between the primary and secondary pipelines. Air bridge hoses can interconnect air insertion fittings within a sump chamber to permit simultaneous pressure testing of more than one secondary pipeline in the secondary pipeline system. The seals further provide a centralization function to limit the radial movement of a primary pipeline within a secondary pipeline to reduce the risk of impact damage caused by pressure spikes in the primary pipeline system.

16 Claims, 4 Drawing Sheets

DOUBLE CONTAINMENT PIPING SYSTEM AND CENTRALIZATION SEAL THEREFOR

BACKGROUND OF THE INVENTION

1. Field of the Invention

This invention relates generally to double containment pipelines having a primary pipeline within a secondary pipeline interconnecting two or more sumps, and, more particularly, to an improved double containment piping system and a centralization seal therefor that both secures the primary pipeline within and permits pressure testing of the secondary pipeline.

2. Description of the Related Art

Underground pumping systems are generally utilized in gasoline stations and other installations to transfer fluids from storage tanks to dispensing pumps through pipelines. In initial installations, the underground systems incorporated pipelines that included single wall pipes connected together at the installation with associated fittings. The pipelines were formed from pipes extending from a fitting in a storage tank sump chamber to a second fitting in a dispensing sump chamber and from there to a dispenser. Any leakage from a sump fitting would cause fluid to flow to the bottom of the sump. While the sumps provided an area that could be viewed from above to determine whether the adjacent fitting had leaked, the underground storage tanks, the pipelines, and the dispensing tanks also proved to be sources of environmental pollution, as well as safety hazards, resulting from the leakage of fuel into the surrounding earth.

To minimize these hazards, double containment systems were developed in which the primary pipeline is surrounded by a secondary pipeline. The secondary pipe has a larger diameter than the primary pipe to enable the secondary pipe to slide over the primary pipe or the primary pipe to slide through the secondary pipe during installation, as the case may be. In general, the secondary fittings are installed around the primary fittings and the secondary fittings serve as the only means for centering the primary pipeline within the secondary pipeline. However, pressure spikes in the primary pipeline can occur which might cause it to impact the secondary pipeline, resulting in damage to one or both pipelines. This is particularly common with secondary containment systems that include flexible primary pipelines that are encapsulated in metal jackets.

Further, to minimize environmental and safety hazards, secondary containment systems should be tested prior to finalization and periodically retested to ensure their integrity. In the past, secondary pipelines have not been pressure tested because the ends of each section of secondary pipeline have terminated within the open area of a sump. By necessity, sumps have an opening to the surface of the ground above, to permit access and visual inspection to determine if any fluid has leaked from the primary pipeline and been collected by the secondary pipeline. However, this opening makes air pressure testing of the secondary pipeline difficult, if not totally impractical, because the secondary pipeline is not an inherently airtight system.

Accordingly, there is a need to control movement of the primary pipeline within the secondary pipeline to prevent impact damage caused by pressure spikes and for a testing system that permits efficient and reliable air pressure testing of the secondary pipeline to assure its integrity. The present invention fulfills these needs.

SUMMARY OF THE INVENTION

Briefly, and in general terms, the present invention resides in an improved double containment piping system, and in a centralization seal therefor, which both limits radial movement of the primary pipeline and seals the space between the primary and secondary pipeline structures to enable pressure testing of the secondary pipeline system. Through use of a centralization seal, the invention reduces the risk of impact damage between the primary and secondary pipelines caused by pressure spikes and, at the same time, enables efficient and reliable air pressure testing of each segment of secondary pipeline.

More specifically, the double containment pipeline system of the present invention includes a primary pipeline system that extends between two spaced-apart sump chambers. A secondary pipeline structure interconnects the two sumps in a fluid tight manner and surrounds the primary pipeline system, thereby forming a space between the exterior surface of the primary pipeline system and the interior surface of the secondary pipeline structure. A centralization seal is installed between the interior surface of the secondary pipeline structure and an adjacent exterior surface of the primary pipeline system at each end of the secondary pipeline structure, within the sumps, to form airtight end walls between the two pipeline system surfaces. An air insertion fitting disposed near each end of the secondary pipeline structure, also within the sumps, permits pressure testing of the space between the primary and secondary pipeline systems to detect any leakage in the secondary pipeline system. In addition to enabling this pressure test, the seals serve a centralization function to limit the radial movement of the primary pipeline within the secondary pipeline in order to minimize the problem of impact damage from pressure spikes in the primary pipeline.

A typical gasoline station or other installation may have a series of sumps, including one or more storage tank sumps, intermediate dispenser sumps, and terminating sumps, each interconnected by doubly contained pipelines. The present invention can be utilized to pressure test each individual segment of secondary pipeline structure interconnecting two spaced apart sumps, or in a further aspect of the invention, to test any number of secondary segments or the entire secondary system at one time by using an air bridge hose to interconnect secondary pipeline structures together via their air insertion fittings within the intermediate and storage tank sump chambers, as desired. Preferably, the air bridge hoses are releasably connectable to the air insertion fittings to permit the hoses to be removed after pressure testing is complete. At a later date, the air bridge hoses can be reconnected to the air bridge fittings for periodic pressure testing of the complete secondary pipeline or any portion thereof.

The centralization seal of the present invention includes an annular housing having inner and outer circumferential sealing surfaces. The seal housing is sized to extend between the exterior surface of the primary pipeline system and the interior surface of the secondary pipeline structure. Annular channels are formed in both the inner and outer circumferential sealing surfaces for receiving sealant. After the seal is installed, the sealant material is injected through an injection channel that extends from an exposed surface of the seal housing into one of the annular channels. One or more connecting channels are formed in the seal housing to extend between the inner and outer annular channels in order to ensure that the sealant is distributed throughout both annular channels. The sealant material serves not only to seal the spaces between the primary and secondary pipeline systems, it acts as an adhesive to permanently fix the primary pipeline system in place.

Other features and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
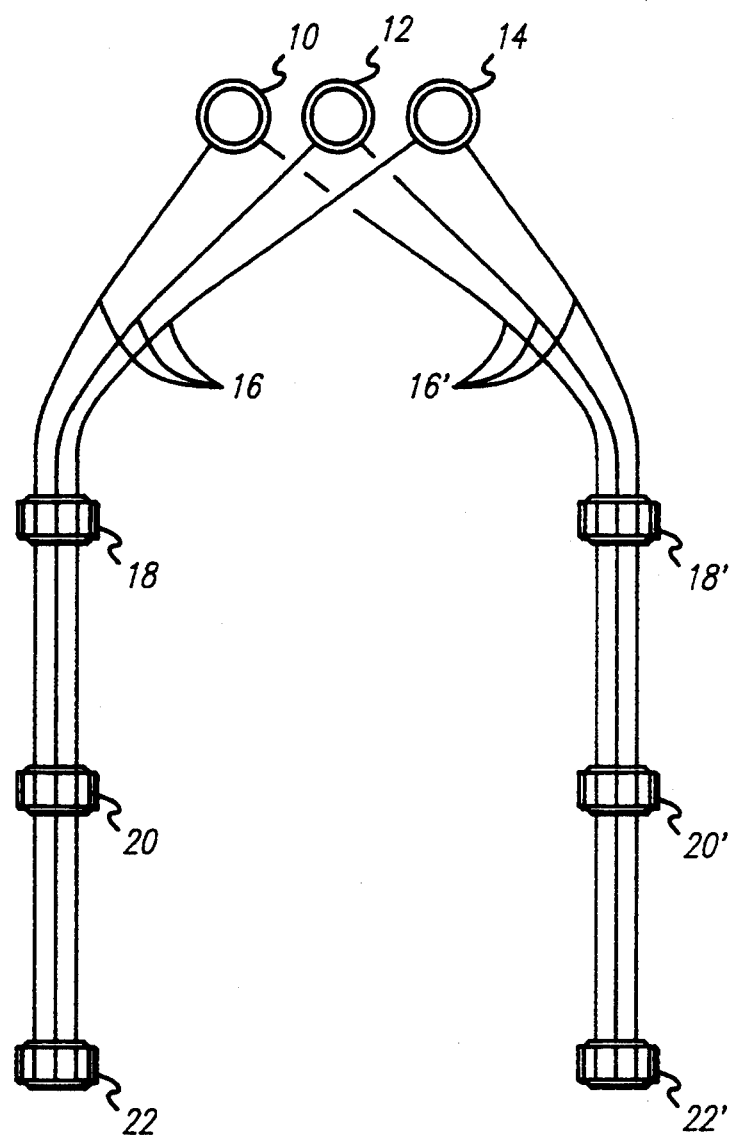
FIG. 1 is a schematic diagram of an underground pumping system with storage tank sumps, intermediate sumps, terminating sumps, and a double containment pipeline system embodying the present invention.

Referring now to the drawings, and particularly to FIG. 1 thereof, there is shown diagrammatically a typical underground installation for a gasoline station having three fluid tanks and, therefore, three storage tank sump chambers 10, 12 and 14 for as many different grades of gasoline. Although not shown, the storage tanks are each connected to a submersible pump housed in the respective storage tank sump. The pumps are then connected through a primary pipeline system to a standard fluid (e.g., gasoline) dispenser. In the embodiment shown in FIG. 1, each of the storage tanks supplies fluids to two pipelines 16 and 16' and each pipeline provides fluid to two intermediate dispenser sump chambers 18, 18', 20 and 20' and then to a terminating dispenser sump chamber 22 and 22'.

Figure 2:
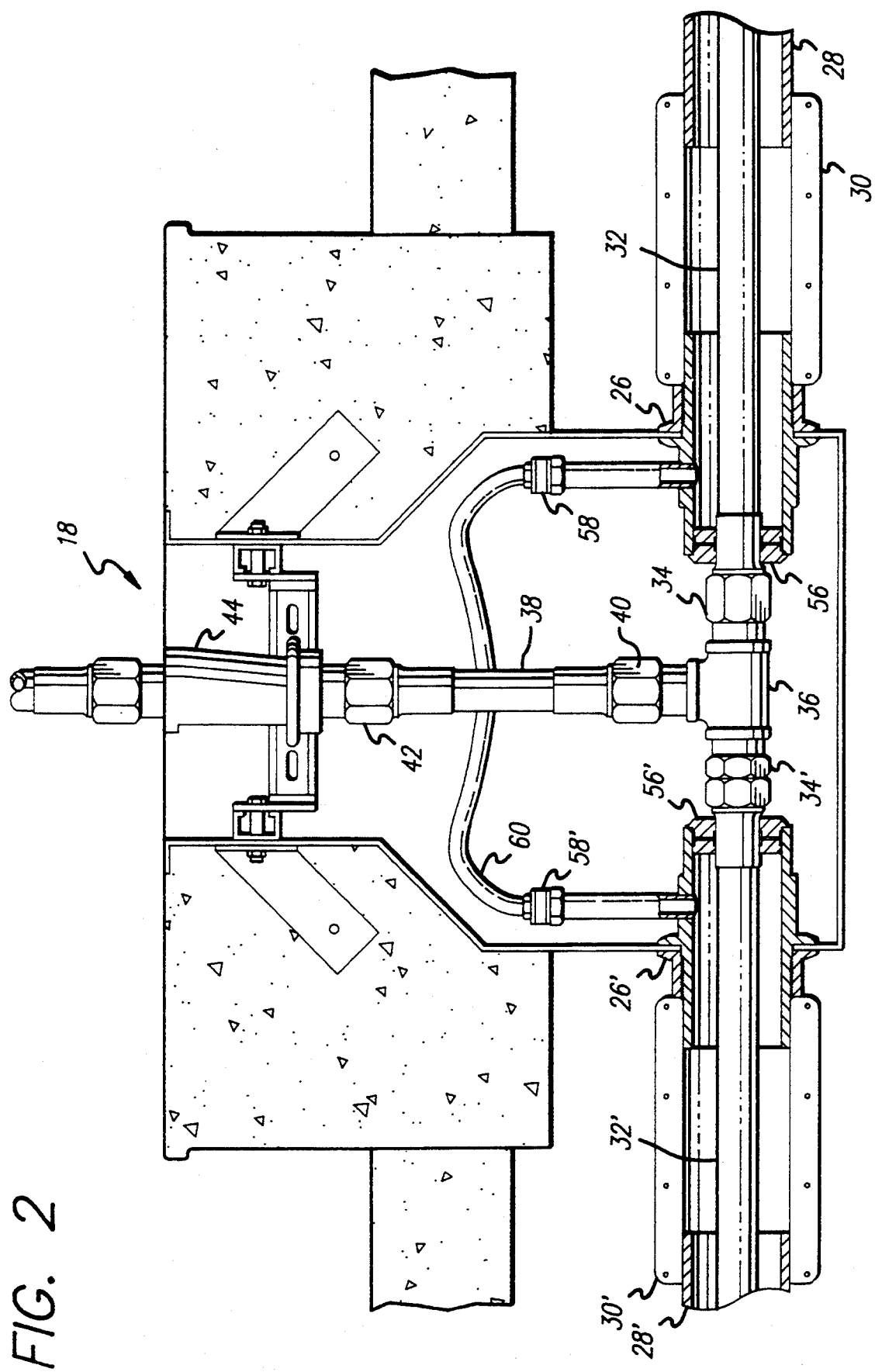
FIG. 2 is a cross sectional view of an intermediate sump, showing the use of a centralization seal to limit radial movement of the primary pipeline and to form an airtight wall between the primary pipeline system and the secondary pipeline structure for pressure testing in accordance with the principles of the present invention.

As shown in FIG. 2, to limit environmental and safety hazards, the primary pipeline system is surrounded by secondary pipelines comprising secondary pipes 28 and 28' and associated fittings and couplings. In FIG. 2, the secondary pipes 28 and 28' are shown connected by standard clamshell couplings 30 and 30' to sump penetration fittings 26 and 26', respectively. It will be appreciated that the sump penetration fittings may be considered part of the sump, but for ease of discussion herein, they will be deemed part of the secondary pipelines. Primary pipelines comprising primary pipes 32 and 32' and associated fittings of smaller diameter than the secondary pipeline components extend through the secondary pipelines 28 and 28' into the sump chamber 18. The primary pipes 32 and 32' are connected together in the sump chamber 18 by standard fittings 34 and 34', respectively, via a tee joint fitting 36. The tee joint fitting 36 supplies fluid to an above ground dispenser (not shown) via a section of primary pipe 38 coupled by standard fittings 40 and 42 to a safety shear valve 44 anchored in place near the top of the sump chamber 18.

Figure 3:
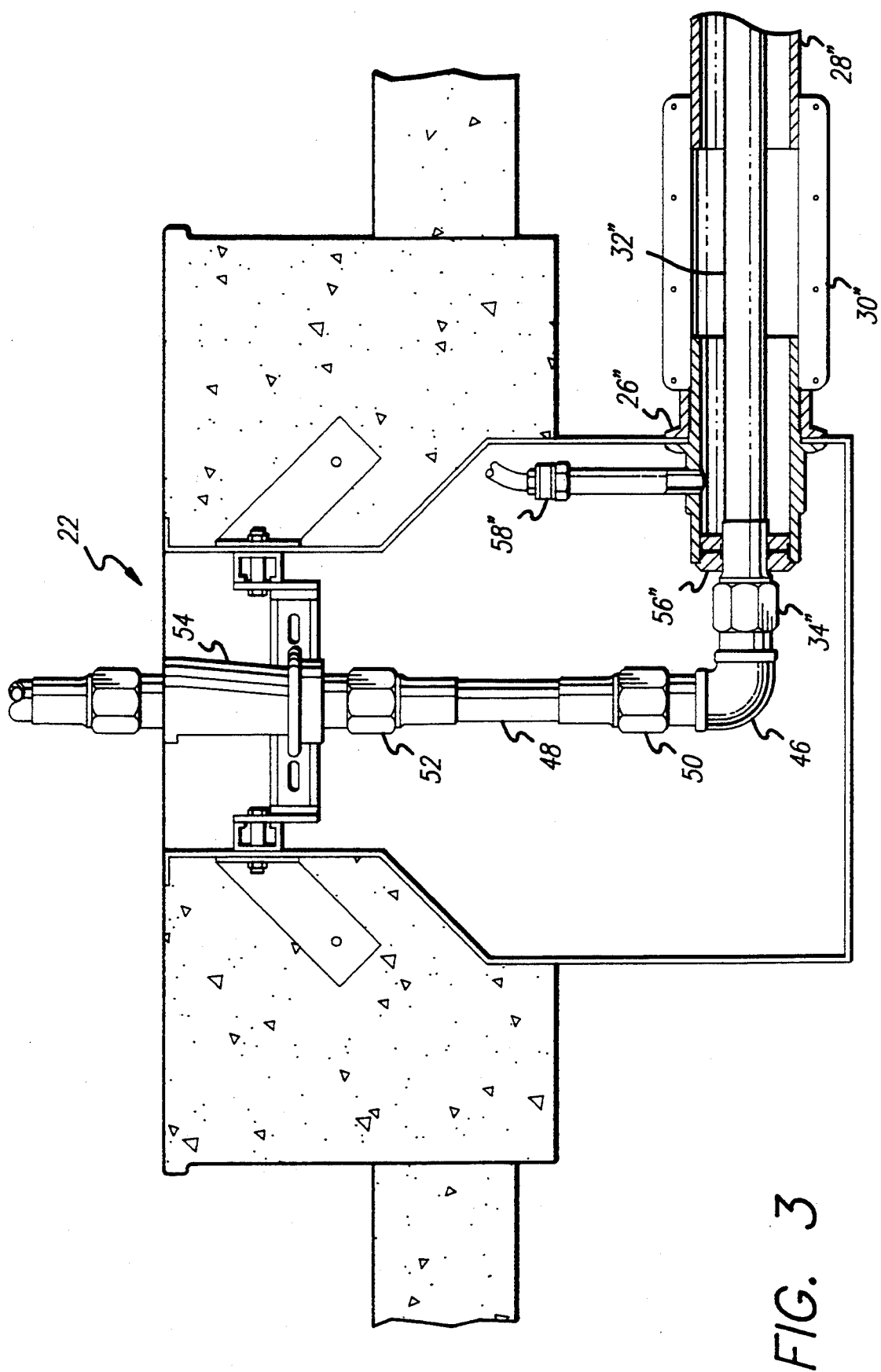
FIG. 3 is a cross sectional view, similar to that of FIG. 2, illustrating application of the principles of the invention to a terminating sump.

FIG. 3 shows a similar double containment system arrangement with a secondary containment pipeline in connection with a terminating sump chamber 22, except that there is only a single penetration fitting 26" to which a secondary pipe 28" is connected by a clamshell coupling 30", and the primary pipeline consists of a primary pipe 32" connected by a standard fitting 34" to an elbow joint fitting 46 within the sump chamber for supplying fluid to an above ground dispenser (also not shown). A section of primary pipe 48 leading to the dispenser is again coupled by standard fittings 50 and 52 to a safety shear valve 54 anchored near the top of the sump chamber 22. Although not shown, a similar arrangement of primary pipeline and secondary double containment pipeline components is utilized at the storage tank sumps.

The primary pipeline system described above is, of course, intended to provide a fluid tight delivery system from storage tanks to dispensers. The secondary pipelines, in turn, are intended (in conjunction with the sump chambers) to enclose the primary pipeline system and to interconnect the sumps, all in a fluid tight manner to protect against any leaks that may develop in the primary pipeline system. However, the effectiveness of the secondary pipelines depend on their integrity. Because each secondary pipeline terminates at a sump, and sumps generally do not provide an airtight environment, it has not been practical heretofore to pressure test the secondary pipeline system, or any portion thereof, for leakage.

To overcome the foregoing problem, annular centralization seals 56 and 56' are utilized to seal the ends of the secondary pipeline around the primary pipes 32 and 32' and their associated fittings 34 and 34' within the intermediate sump 18 chamber (FIG. 2). A like annular centralization seal 56" is used in the same manner to seal the end of the secondary pipeline around the primary pipe 32" and its associated fitting 34" within the terminating sump chamber 22 (FIG. 3). Although not shown, another centralization seal is affixed at the other ends of each of the secondary pipelines to create completely enclosed spaces between the secondary and primary pipeline systems. Air insertion fittings 58, 58' and 58", installed in each secondary pipeline, then allow a simple air pressure test to be performed, by connecting a source of compressed air to one fitting and a standard pressure gauge (not shown), to determine whether that pipeline is fluid tight.

The annular seals 56, 56' and 56" each have an outer diameter sized for sealing engagement in the end of their respective sump penetration fittings 26, 26' and 26", which form part of the secondary pipelines, and an inner diameter sized for sealing engagement with the fittings 34, 34' and 34" for the primary pipes 32, 32' and 32". The seals 56, 56' and 56" thus form airtight end walls for the spaces between the primary and secondary pipelines systems at the ends of each secondary pipeline where it terminates in a sump chamber. In the preferred embodiment, each seal 56, 56' and 56" is affixed adhesively both to the interior surface of its respective penetration fitting 26, 26' and 26" and to the adjacent exterior surface of the primary pipe fitting 34, 34' and 34". The seals can be affixed by applying an adhesive sealant material directly to their inner and outer circumferential surfaces prior to installation, or by applying a sealant material after installation to both surfaces through injection and flow channels formed in the seals, as described in more detail below.

In the presently preferred embodiment, both the sumps and the components of the secondary pipeline system, including the secondary pipes, the clamshell couplings, and the penetration fittings, can all be made of a composite fiberglass material, which has the advantage of being lightweight, yet strong, economical and corrosion resistant. The primary pipe preferably is a flexible hose from Titeflex Company by the name Titeflex. The fittings for the primary pipeline system can be stainless steel or other suitably corrosion-resistant material.

In addition to overcoming the problem of testing the integrity of the secondary containment system heretofore made impractical by its interconnection with the sump chambers, the centralization seals 56, 56' and 56" have the desirable effect of centering and holding the primary pipeline system radially within the secondary pipeline system. The seals thus reduce the risk that the primary pipeline components will impact the secondary pipeline structures when pressure spikes occur in the primary pipeline system. These pressure spikes are known to cause damage to the pipelines, particularly in secondary containment systems that use flexible primary pipelines encapsulated in metal jackets that can abrade the fiberglass surface of a secondary pipeline.

The preferred embodiment of the present invention makes it possible not only to pressure test each secondary pipeline in the secondary pipeline system, but to test more than one secondary pipeline at a time. To this end, an air bridge hose 60 can be utilized to interconnect the two secondary pipelines entering the intermediate sump chamber 18 through their respective air insertion fittings 58 and 58'. As a result, both secondary pipelines can be tested simultaneously. Similarly, by installing air bridge hoses between the secondary pipelines within each intermediate sump chamber and within the storage tank sump chambers, the overall secondary pipeline system for an entire installation can be tested at one time. Alternatively, only selected portions can be tested in order to isolate a leak in the secondary system.

The air insertion fittings 58 and 58' preferably each have a releasable connector for attachment of the air bridge hose 60. Releasable connectors permit the air bridge hoses to be removed after pressure testing is complete. Then, at a later date, the air bridge hoses can be reconnected for periodic pressure testing of the complete secondary pipeline system or any portion thereof. Although the air insertion fittings 58, 58' and 58" are illustrated in FIGS. 2 and 3 as installed with their connector ends above their respective penetration fittings 26, 26' and 26", pointing upward, the air insertion fittings also can be installed with their connector ends below the penetration fittings, pointing downward, to allow any fluids that leak from the primary pipeline to flow into the intermediate sump chamber to aid detection of leaks.

Figure 4:
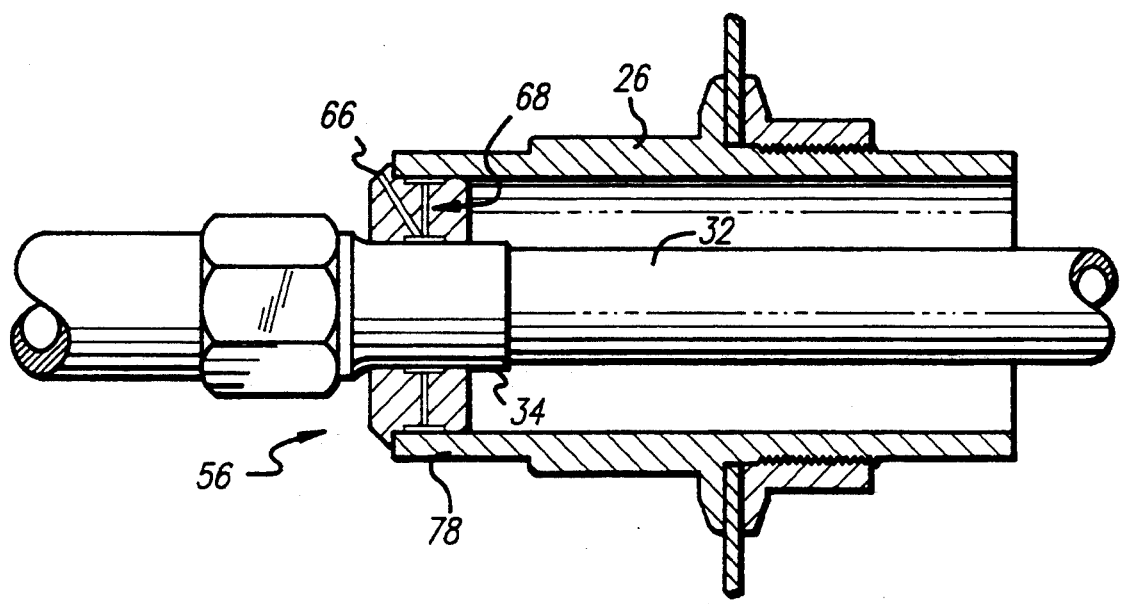
FIG. 4 is an enlarged cross sectional view of a portion of a primary pipeline system and a secondary pipeline structure with a centralization seal therebetween.
Figure 5:
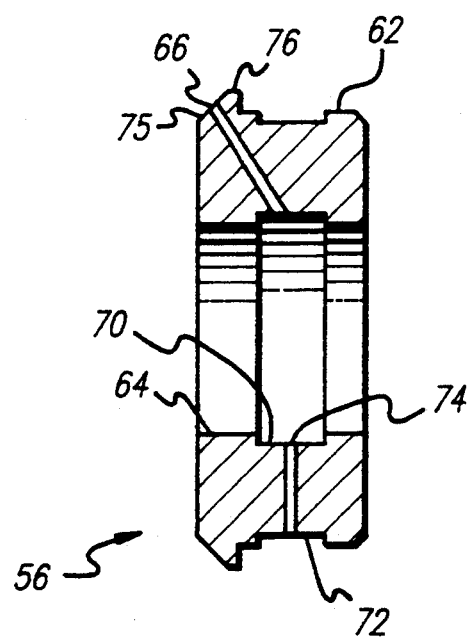
FIG. 5 is a cross sectional view of the centralization seal of FIG. 4.

Turning now to FIGS. 4 and 5, one embodiment of a centralization seal 56 for use in the improved double containment piping system of the present invention is illustrated in detail. The centralization seal 56 is a generally annular structure formed of an elastomeric material. It includes an outer circumferential surface 62 having a diameter sized to engage the interior surface of the penetration fitting 26 and an inner circumferential surface 64 having a diameter sized to engage the adjacent exterior surface of the primary pipe fitting 34.

In the preferred embodiment, a sealant material is used to affix the outer and inner circumferential surfaces 62 and 64 of the centralization seal to the pipeline components they engage. To this end, as mentioned, injection and flow channels 66 and 68, respectively, are formed in the seal 56 to receive and distribute the sealant to the inner and outer circumferential surfaces of the seal. The flow channel 68 comprises an inner open annular channel portion 70 formed in the inner circumferential surface 64 of the seal, an outer open annular channel portion 72 formed in the outer circumferential surface 62 of the seal, and a plurality of radially-directed closed connecting channel portions 74 interconnecting the two annular channel portions. In the preferred embodiment there are four equiangularly-spaced connecting channel portions 74. The injection channel 66 extends at an angle from a side surface 75 of the seal 56 to the inner annular channel portion 70. The downward slope of the injection channel eases insertion of a syringe filled with sealant material. A flange 76 extends radially outwardly from the side surface and, as best seen in FIG. 4, is sized to abut against the end rim 78 of the penetration fitting 26 when the centralization seal is installed in place. The flange 76 helps serve to properly locate the seal in the end of the penetration fitting. After the seal is installed in place, sealant injected through the injection channel 66 into the inner annular channel portion 70 of the seal is distributed to the outer annular channel portion 72 via the radially-directed connecting channel portions 74. The adhesive sealant material is a thermoset resin such as 3M-DP-100NS adhesive.

Figure 6:
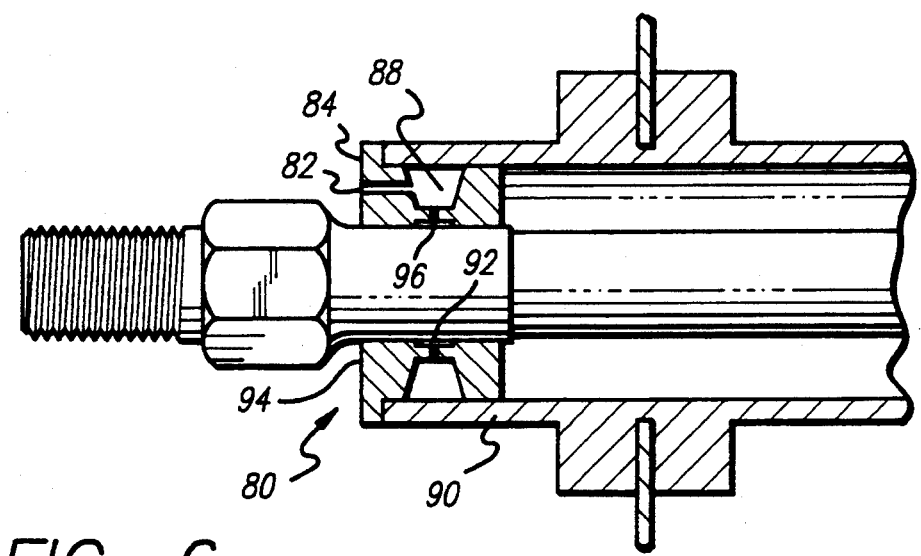
FIG. 6 is a cross sectional view of an alternative embodiment of a centralization seal shown positioned between a primary pipeline system and a secondary pipeline structure.

FIG. 6 illustrates an alternative embodiment of a annular centralization seal 80 similar to the seal 56 illustrated in FIGS. 4 and 5. In the seal of FIG. 6, an injection channel 82 extends horizontally from a side surface 84 of the seal to a flow channel. With this seal, the injection channel 82 extends into an outer open annular channel portion 88 formed in an outer circumferential surface 90 of the seal. This outer annular channel portion 88 has a frustoconical cross-section that diverges radially outwardly. The flow channel also has a relatively shallow inner annular channel portion 92, with a frustoconical cross-section that diverges radially inwardly, formed in an inner circumferential surface 94 of the seal. Again, a plurality of radially-extending connecting channel portions 96 interconnect the outer and inner channel portions 88 and 92 to permit sealant material to pass from the outer to the inner annular channel portion during installation of the seal.

It will be appreciated from the foregoing description that the present invention provides an improved double containment pipeline system that enables enhanced pressure testing of a secondary pipeline system, or a portion thereof, and also limits radial movement of a primary pipeline system. Centralization seals are affixed to the ends of a secondary pipeline to provide a sealed wall between primary and secondary pipelines and to limit radial movement of the primary pipeline system that can occur during pressure spikes. Air insertion fittings installed in each secondary pipeline permit pressure testing of the secondary pipeline system. An air bridge hose can be utilized to interconnect two secondary pipelines terminating within a common sump chamber through their respective air insertion fittings to enable simultaneous pressure testing of both secondary pipelines.

Although the present invention has been described in detail with reference only to the presently preferred embodiments, those of ordinary skill will appreciate that various modifications can be made without departing from the invention. Accordingly, the invention is limited only by the following claims.

I claim:

1. A double containment piping system, comprising:
   at least two spaced-apart sump chambers;
   an inner primary pipeline extending between the sump chambers;
   an outer secondary pipeline interconnecting the sump chambers in a fluid tight manner, the secondary pipeline surrounding the primary pipeline and forming a space between the exterior surface of the primary pipeline and the interior surface of the secondary pipeline;
   a centralization seal disposed at each end of the secondary pipeline within a sump chamber, each seal extending between an interior surface of the secondary pipeline and an adjacent exterior surface of the primary pipeline to provide a sealed wall between the primary pipeline and the secondary pipeline; and
   at least one air insertion fitting extending into the space between the primary pipeline and the secondary pipeline intermediate the seal and the sump chamber wall to enable pressure testing of the secondary pipeline.

2. A double containment piping system for dispensing fluid from a source of fluid to one or more dispensers, comprising:
   a sump chamber;
   at least two inner primary pipelines extending from the sump chamber;
   at least two outer secondary pipelines each having a larger diameter than the primary pipelines and connected to the sump chamber in a fluid tight manner, each secondary pipeline surrounding a primary pipeline so as to form a space between the exterior surface of the primary pipeline and the interior surface of the secondary pipeline;
   a seal disposed near the ends of each secondary pipeline within a sump chamber, each seal being affixed to the interior surface of the secondary pipeline and to an adjacent exterior surface of the primary pipeline to provide an airtight wall between the primary pipeline and the secondary pipeline; and
   an air insertion fitting disposed near one end of each secondary pipeline intermediate the seal and, the sump chamber wall for inserting air into the sealed space between each primary pipeline and its surrounding secondary pipeline.

3. The double containment piping system of claim 2, wherein the air insertion fittings are located within the sump chamber.

4. The double containment piping system of claim 2, and further including:
   an air bridge hose for interconnecting the air insertion fittings of the secondary pipelines.

5. The double containment piping system of claim 4, wherein the air insertion fittings are located within the sump chamber.

6. The double containment piping system of claim 4, wherein the air bridge hose is releasably connectable to each air insertion fitting.

7. A double containment piping system for dispensing fluid from a source of fluid to one or more dispensers, comprising:
   a plurality of spaced-apart sump chambers, including a fluid source sump chamber, one or more intermediate dispenser chambers, and a terminating dispenser sump chamber;
   an inner primary pipeline extending between each successive pair of sump chambers from the fluid source sump chamber to the terminating dispenser sump chamber;
   an outer secondary pipeline having a larger diameter than the primary pipeline and interconnecting each successive pair of sump chambers from the fluid source sump chamber to the terminating dispenser sump chamber in a fluid tight manner, each secondary pipeline surrounding a primary pipeline so as to form a space between the exterior surface of the primary pipeline and the interior surface of the secondary pipeline;
   an elastomeric seal disposed near the ends of each secondary pipeline within a sump chamber, each seal being affixed to the interior surface of the secondary pipeline and to an adjacent exterior surface of the primary pipeline to provide an airtight wall between the primary pipeline and the secondary pipeline; and
   an air insertion fitting disposed near one end of each secondary pipeline intermediate the seal and the sump chamber wall for inserting air into the sealed space between each primary pipeline and its surrounding secondary pipeline.

8. The double containment piping system of claim 7, wherein each air insertion fitting is located within a sump chamber.

9. The double containment piping system of claim 8, wherein at least one secondary pipeline has an air insertion fitting disposed near each end thereof, and further including:
   at least one air bridge hose for interconnecting the air insertion fittings of at least one pair of successive secondary pipelines.

10. The double containment piping system of claim 9, wherein each air bridge hose is releasably connectable to each air insertion fitting.

11. A double containment piping system, comprising:
    a sump chamber;
    an inner primary pipeline extending into the sump chamber;
    an outer secondary pipeline connected to the sump chamber in a fluid tight manner, the secondary pipeline surrounding the primary pipeline and forming a space between the exterior surface of the primary pipeline and the interior surface of the secondary pipeline; and
    a seal disposed near the end of the secondary pipeline within the sump chamber, the seal including an annular housing having an outer circumferential surface engaging an interior surface of the secondary pipeline and an inner circumferential surface engaging an exterior surface of the primary pipeline, the seal housing further having a flow channel defined therein for distributing a sealant material to the outer circumferential surface and to the inner circumferential surface of the seal, and the housing further having an injection channel defined therein for injection of the sealant material into the flow channel, the injection channel extending into the seal housing from a surface of the housing that is exposed when the seal is inserted between the secondary pipeline and the primary pipeline.

12. The double containment piping system of claim 11, wherein the flow channel in the seal housing further comprises an inner annular channel portion formed in the inner circumferential surface, and an outer annular channel portion formed in the outer circumferential surface.

13. The double containment piping system of claim 12, wherein the flow channel in the seal housing further comprises a radial channel portion interconnecting the inner annular channel portion and the outer annular channel portion.

14. The double containment piping system of claim 12, wherein the inner annular portion of the seal flow channel extends around the entire inner circumference of the seal, and the outer annular portion of the flow channel extends around the entire outer circumference of the seal.

15. The double containment piping system of claim 11, further comprising a flange extending radially from the outer circumferential surface of the seal adjacent to a surface of the housing that is exposed when the seal is inserted between the secondary pipeline and the primary pipeline, the flange having a diameter larger than the diameter of an interior surface of the secondary pipeline so as to abut against an end of the secondary pipeline.

16. A method of installing a double containment piping system, comprising:

installing a primary pipeline between a storage tank sump chamber and a fluid dispenser sump chamber for coupling to a storage tank and a fluid dispenser;

testing the primary pipeline for leaks;

subsequently installing a secondary pipeline between the storage tank sump chamber and the fluid dispenser sump chamber around the primary pipeline, including installing a portion of the secondary pipeline inside the storage tank sump chamber and the fluid dispenser sump chamber;

inserting a centralization seal into the interior of the secondary pipeline within the storage tank sump chamber such that the seal extends between an interior surface of the secondary pipeline and an adjacent exterior surface of the primary pipeline to provide a sealed wall between the primary pipeline and the secondary pipeline;

inserting a centralization seal into the interior of the secondary pipeline within the fluid dispenser sump chamber such that the seal extends between an interior surface of the secondary pipeline and an adjacent exterior surface of the primary pipeline to provide a sealed wall between the primary pipeline and the secondary pipeline;

installing an air insertion fitting through the wall of the secondary pipeline within the storage tank sump chamber intermediate the seal and the sump chamber wall;

installing an air insertion fitting through the wall of the secondary pipeline within the fluid dispenser sump chamber intermediate the seal and the sump chamber wall; and pressure testing the secondary pipeline.

* * * * *